June 10, 1930.  D. C. OBER  1,762,191
HIGH VOLTAGE UNDERGROUND CABLE SYSTEM
Filed July 7, 1922
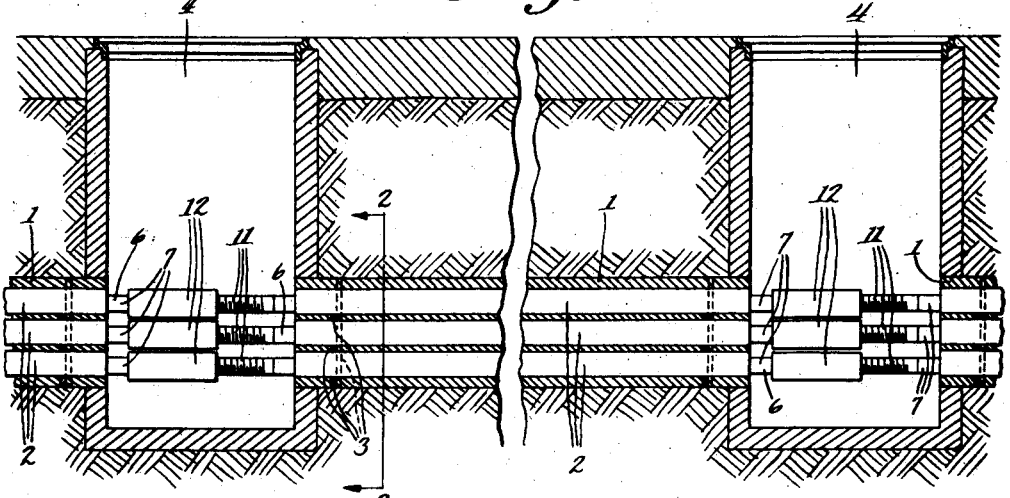
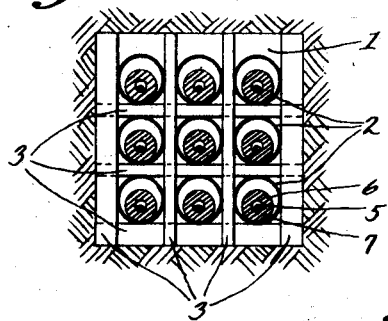
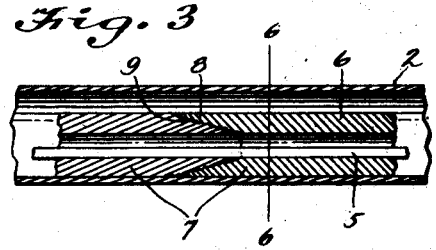
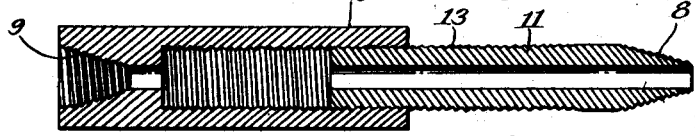
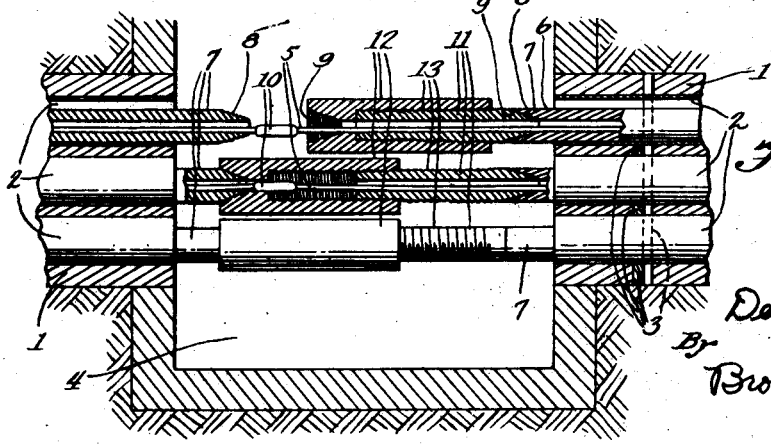
Inventor
Dean C. Ober
By Brockett + Hyde
Att'ys Patented June 10, 1930

1,762,191

UNITED STATES PATENT OFFICE

DEAN C. OBER, OF CLEVELAND, OHIO

HIGH-VOLTAGE UNDERGROUND CABLE SYSTEM

Application filed July 7, 1922. Serial No. 573,334.

This invention relates to the transmission of high voltage current under ground, and more particularly to the construction and manner of assembly of the underground cable in the duct or subway in which it is placed. The invention resides not only in the construction of the cable and other parts but also in the method of installing the same.

In the commercial transmission of high voltage current the common practice is, of course, to string the cables or wires above ground. However, local conditions, such as the inability to secure a right-of-way for overhead transmission or local rules or restrictions frequently compel the transmission of high voltage current under ground. Under such conditions the voltage possible to safely transmit is practically limited by the character and construction of the cable insulation, the efficiency of which is itself limited by the necessity of bending underground cables when inserting them into the duct at the manhole. This is due to the fact that the common form of insulation for high voltage cables is practically a plastic compound containing paper, oils and the like covered with a lead sheath, and the bending of such cables is likely to break the insulation and destroy its efficiency. Trenching and placing of the cable sidewise in the trench enables better insulation to be used, but cables so placed must be abandoned in case of a blow-out or injury due to the inability to replace them.

The present invention has for its object to provide an underground cable system in which the transmission of much higher voltage, to wit, current up to one hundred thousand volts or more, is possible, due to the ability to supply more perfect insulation and the avoidance of any necessity of bending the cable or insulation in inserting the same.

Other objects of the invention will appear more in detail from the description hereafter.

The invention comprises the construction and arrangement of parts and the various method steps and series of steps hereinafter described and claimed.

In the drawings, Fig. 1 is a longitudinal sectional elevation through a series of underground ducts or subways; Fig. 2 is a cross section on the line 2—2 of Fig. 1; Fig. 3 is a longitudinal sectional view through a portion of underground cable embodying the invention; Fig. 4 is a detailed sectional elevation of a manhole and a partly joined cable; Fig. 5 is a detailed sectional view of an insulating connector; and Fig. 6 is a cross section on the line 6—6, Fig. 3.

The present invention requires for installation of the cable system a duct or conduit in a "subway", as it is called, through which the cable is threaded. This duct, as it will be called hereafter, forms no part of the present invention and may be of any suitable form made of fibre, clay, concrete, wood or other material. The drawings show for this purpose a monolithic concrete body 1 in which are imbedded a series, nine being shown, of ducts 2 each formed of a series of clay pipes laid end to end and held spaced during pouring of the concrete by suitable wooden spacers 3. These ducts extend from manhole to manhole, one manhole being indicated conventionally at 4, in the usual manner.

The cable for transmitting the current is illustrated in detail in Figs. 3, 4 and 5. It comprises two members, to wit, the transmission wire 5, which is a continuous bare wire of any suitable size, say one-half inch in diameter, and made of any suitable material, such as copper, aluminum or the like, said wire lying within and being surrounded by the insulation member 6. The latter is a solid insulator, as distinguished from the plastic insulation commonly employed for high voltage cables and before referred to. The insulating material may be any efficient insulator, such as porcelain, composition or other suitable material. One very efficient form of insulation is a wrapped paper tube, the layers of paper being impregnated with a suitable form of synthetic organic material resulting from the condensation of phenols and formaldehyde. This material can be made in tubular form and hardened by heat and pressure to any degree of hardness and in pieces of any suitable length. Indeed, it can be made of such texture and character as to enable it to be turned or cut with tools like metal. The insulation member is made of a series of sections 7 each of a suitable length enabling it to be readily manipulated in the manhole space for insertion into a duct. Opposite ends of each section are suitably arranged for detachable connection to each other. One suitable arrangement for this purpose is the provision of an external tapered thread 8 on one end of the section and an internal tapered thread 9 on its opposite end, the threads being of relatively slow pitch so as to provide a more tortuous joint and afford as high resistance to the discharge or leakage of current across the joint as is possible. In assembling the tube sections, the threaded joints, before being screwed together, are coated with some suitable cement or plastic compound to mechanically seal the joint and keep air and moisture out of the cavity within the insulating member.

The insulating member may be of any suitable diameter, both internally and externally. Externally its diameter may be slightly less than the internal diameter of the duct within which it is placed. Its internal diameter is of course so chosen with reference to the diameter of the wire 5 and the external diameter of the tube as to supply the proper thickness of insulating wall. For example, with a one-half inch wire the insulating member may have an external diameter of three inches and an internal diameter of one inch, providing an insulating wall an inch thick.

In placing the cables in the ducts the two members of the cable are inserted from the manholes. The wire 5 may be threaded through the duct first and the sections of tubular insulation threaded over the wire and joined together as they are pushed along the same, or, if desired, the tubular insulator may be first built up by pushing in section after section and joining sections as the operation proceeds and afterwards threading the wire through the insulation.

When the duct between the manholes has been filled with the proper lengths of wire and insulation a proper joint is made at the manhole. For this purpose the adjoining ends of wire sections 5 may be connected in any suitable manner, such as by a wrapped joint 10 of wire and solder, a sleeve joint or any other suitable well known connection. Proper continuity is then established between the two tubular insulators on opposite sides of the joint, such as by a special connecting device shown in Fig. 5 and comprising male and female members 11, 12 threaded together at 13 by a relatively long series of threads to secure maximum adjustability, and threaded at their opposite ends to mate with the adjoining sections of the tubular insulating member. This connecting device is placed in position, as at the top in Fig. 4, before the wire joint is made, and after making the wire joint, the connecting device is screwed out to couple up the insulation, as also shown at the middle level, Fig. 4. A plastic cement or compound is used in the threads of the connecting device, as at other joints.

One important feature of the present invention is the arrangement employed for preventing potential stress across an air gap within the insulation. For this purpose, the inner surface of all of the sections of the insulating member 6, including the connecting members 11, 12, is coated with some suitable conducting material, which may be a layer of metallic paint, or may be a layer of metal foil with one edge wrapped with the paper of the tube and which metal paint or metal foil is exposed within and forms a complete lining for the insulator. Such a lining is indicated at 14. It is in contact with the bare conducting wire 5 and therefore is at the same potential with said wire. As a consequence there is no breakdown potential across an air gap within the insulation, even though the external diameter of the wire 5 is considerably less than the internal diameter of the insulation. There is, therefore, no oxidizing effect upon either the wire or the insulation.

Several wires 5 may be joined in two- three- four- or other multiple wire circuits. In such case it is not necessary to break the continuity of the usual lead sheath employed on high voltage cables for the purpose of eliminating sheath current, nor is it necessary to bond together and ground the sheaths to prevent standing potential from sheath to sheath or from sheath to ground. Regardless of the size of wire initially installed in an insulating tube, the tube insulation can be made of such thickness with relation to the size of hole within said tube that perfect insulation is offered for the maximum potential stress possible from any size wire that can be installed in the hole. The diameter of wire may also be changed, either increased or diminished, without any effect upon the potential stress across the insulation.

In this system no lead sheath is necessary and consequently the wire has higher load capacity because sheath currents are eliminated. Again, it may be assembled more readily due to the ease of handling the knockdown insulation as distinguished from heavy lead-covered cable which is more or less inflexible and at that ought not to be bent. The wire and knockdown sheath can also be more readily handled in storage and transportation than the lead-covered cable and without the same fear of injury to the insulation. Again, in case of a short circuit or injury to the wire or insulation from any cause, either the wire or the insulation may be readily replaced without abandonment of the duct, it being possible by proper disconnection and manipulation at the manholes to withdraw the wire and replace it without disturbing the insulation duct or to withdraw the insulation section by section and replace it without disturbing the wire in the duct.

Other advantages of the invention will be apparent hereafter.

What I claim is:—

The method of assembling high voltage underground cables in preformed, buried ducts, consisting in first forming and inserting an insulating tube endwise in said duct by attaching end to end a series of tubular insulating sections, and then threading a wire through the tubular insulating tube thus formed.

In testimony whereof I hereby affix my signature.

DEAN C. OBER.